United States Patent
Guzda et al.

(10) Patent No.: US 7,237,984 B1
(45) Date of Patent: Jul. 3, 2007

(54) HOLE-CUTTING SAW

(76) Inventors: Thomas G. Guzda, 1300 NW. 71st Ave., Plantation, FL (US) 33313; Jan Guzda, 1300 NW. 71st Ave., Plantation, FL (US) 33313

(*) Notice: Subject to any disclaimer, the term of this patent is extended or adjusted under 35 U.S.C. 154(b) by 0 days.

(21) Appl. No.: 11/160,580

(22) Filed: Jun. 29, 2005

(51) Int. Cl.
B23B 51/04 (2006.01)

(52) U.S. Cl. .................. 408/1 R; 408/201; 408/204

(58) Field of Classification Search .............. 408/79, 408/80, 201, 204, 206, 207, 209, 703, 203.5, 408/1 R; B23B 51/04, 51/05
See application file for complete search history.

(56) References Cited

U.S. PATENT DOCUMENTS

| | | | | |
|---|---|---|---|---|
| 1,848,590 A | * | 3/1932 | Willis | 81/53.2 |
| 2,298,975 A | * | 10/1942 | Shelburne | 408/204 |
| 2,306,807 A | * | 12/1942 | Hulvey et al. | 408/206 |
| 2,561,185 A | * | 7/1951 | Drake | 408/204 |
| 2,633,040 A | * | 3/1953 | Schlage | 408/79 |
| 3,308,689 A | * | 3/1967 | MacDonald | 408/204 |
| 3,944,379 A | * | 3/1976 | Elrod | 408/79 |
| 4,261,093 A | * | 4/1981 | Steffen et al. | 29/426.4 |
| 4,500,234 A | * | 2/1985 | Orth et al. | 408/206 |
| 4,579,486 A | | 4/1986 | Damico | |
| 4,940,370 A | * | 7/1990 | Gipson | 408/72 R |
| 5,061,126 A | | 10/1991 | Cain et al. | |
| 5,143,489 A | * | 9/1992 | Bogner et al. | 408/1 R |
| 5,413,437 A | * | 5/1995 | Bristow | 408/1 R |
| 5,820,315 A | * | 10/1998 | Collard | 408/80 |
| 6,048,141 A | * | 4/2000 | Freeman | 408/201 |
| 6,171,033 B1 | | 1/2001 | Wrobel | |
| 6,514,017 B2 | | 2/2003 | DeBlasio | |

FOREIGN PATENT DOCUMENTS

| | | | | |
|---|---|---|---|---|
| DE | 520335 | * | 3/1931 | 408/204 |
| DE | 2234825 A | * | 1/1974 | |
| JP | 61152309 A | * | 7/1986 | |
| JP | 2001009619 A | * | 1/2001 | |
| JP | 2005271230 A | * | 10/2005 | |
| SE | 81021 | * | 7/1934 | 408/204 |
| SU | 1340927 A1 | * | 9/1987 | 408/204 |

OTHER PUBLICATIONS text for Swedish patent 81021.*

* cited by examiner

Primary Examiner—Daniel W. Howell
(74) Attorney, Agent, or Firm—Malin, Haley & DiMaggio, P.A.

(57) ABSTRACT

The invention relates to a pilot guide and hole-cutting saw system for cutting deep holes through an indeterminate depth of material while eliminating the problem of drift and wobble associated with the use of conventional hole saws. The system comprises a hole saw and a pilot guide, the pilot guide being comprised of a stop, a front guide, a rear guide, and a pilot pin. The pilot pin is created by fitting the central apertures of the stop and front guide over the second end of the pilot pin and by fitting the central aperture of a base portion of the rear guide over the second end of the pilot pin so that the end of the pilot pin terminates inside of the central aperture of the rear guide without passing entirely through the rear guide.

23 Claims, 7 Drawing Sheets

HOLE-CUTTING SAW

FIELD OF THE INVENTION

This invention relates to a saw for cutting circular holes through wood and other materials and to a method for using said saw to cut deep holes through thick materials or layers of materials, holes at an angle, and aligned holes through both sides of a hollow object, such as a pipe.

DESCRIPTION OF RELATED ART

Standard length (depth) hole saws used in the industry today are 1¼ inches in length. This length represents the distance from the end of the teeth on a hole saw to the back of the hole saw, which is referred to as the "cup." The short depth of current conventional hole saws requires the removal of the hole saw from the hole each time that a depth of 1¼ inches is cut to remove the plug material that forms inside the cut of the saw. Because the hole saw must be removed multiple times to cut holes deeper than 1¼ inches, the multiple passes of conventional hole saws provides an inconvenient and time-consuming means for cutting deep holes that also lacks precision. Currently, no commercially available hole saws can saw metal greater than 1¼ inches thick. Moreover, conventional hole saws are unable to saw a hole through pipe or other hollow materials because the drill used to stabilize conventional hole saws does not have any material within which to anchor when said hole saw enters the interior void of the pipe or other hollow material. Without any material within which the drill can anchor the saw, said saw cannot maintain the cutting angle at which the saw first contacts the curved surface of the pipe.

Conventional hole saws also experience problems related to the removal of plug material from the hole being cut. Currently, when sawing holes through wood and other non-metal materials, a chisel or screw driver must be used to remove the plug material from the hole after each sawing before the hole saw can continue to cut the hole in a subsequent pass.

U.S. Pat. No. 6,171,033, issued to Wrobel on Jan. 9, 2001, describes a hand drill extender kit having a length of electrical conduit to create an extender having one end that can be connected with the chuck of a hand drill and another end that can engage and hold a tool, such as a hole saw. This extender merely increases the reach of a conventional hole saw without increasing the depth to which said saw has the ability to cut. The '033 invention suffers from several disadvantages in that the patent does not provide any means for cutting holes of a depth greater than the standard 1¼ inches of conventional hole saws, the invention does not provide a remedy for the problems associated with drifting and wobbling of the hole saw, and the '033 invention does not permit effective cutting of holes through pipe or other hollow materials. The '033 invention also fails to provide a means for holding and maintaining a hole saw at an angle when cutting angled holes through both solid and/or hollow materials.

U.S. Pat. No. 6,514,017, issued to DeBlasio on Feb. 4, 2003, describes a core drill piloting system for attaching to a core drill to pilot said drill while the drill is cutting through concrete, brick, or other masonry. The '017 patent differs from the applicant's invention in that the applicant's invention is not used for cutting holes through concrete or masonry. The '017 invention is also distinguishable from the present invention in that the '017 piloting apparatus connects securely to the core drill while the applicant's invention is free-standing and does not connect to the hole saw. Additionally, the applicant's invention allows one-pass sawing entirely through a material. However, the '017 invention requires that the core drill be removed from the hole being drilled before the final depth is core drilled through the subject material. The '017 invention also includes several inherent disadvantages when compared to the functionality of the applicant's invention including that said invention does not provide a remedy for the problems associated with drifting and wobbling of the attached core drill, and the '017 invention destroys the dowel of plug material that remains unspoiled when the applicant's hole saw is used.

U.S. Pat. No. 5,061,126, issued to Cain et al., on Oct. 29, 1991, describes a hole saw and mandrel assembly comprising a mandrel permanently affixed to a cylindrical hole saw cup. The '126 invention is a one-piece unit so that the mandrel does not have to be attached to the hole saw prior to use. A drill bit is inserted into the hollow mandrel shaft core so that the drill bit protrudes slightly from the cutting edge of the hole saw cup. The drill bit is then welded to the mandrel shaft.

U.S. Pat. No. 4,579,486, issued to Damico on Apr. 1, 1986, describes a hole saw guide for positioning a hole saw while cutting a new hole either partially overlapping or surrounding an existing hole in a work piece. In the '486 invention, two or more guide arms, which are radially adjustable in length, are connected to the cylindrical outer surface of a disc-shaped body, and a pilot drill of a conventional hole saw is inserted through into a pilot drill guide hole to center the hole saw for proper location of the hole to be drilled. The '486 invention differs from the applicant's invention in that the '486 invention does not permit the drilling of holes of great depth through thick materials, nor does the '486 invention permit the effective and precise drilling of aligned holes through hollow materials, such as pipes. Lastly, the applicant's invention is more effective at drilling holes at an angle than the '486 invention.

SUMMARY OF THE INVENTION

This invention relates to a pilot guide and hole-cutting saw system for precisely cutting holes through a great thickness of material, which comprises a hole saw and a pilot guide which is nested inside said hole saw to provide stability to said hole saw during the cutting process. The hole saw comprises a cylindrical portion with inner and outer cylindrical side surfaces, an open end, and a closed end. The open end of said hole saw terminates in a plurality of spaced cutting teeth. The cylindrical portion of the hole saw surrounds a void, into which the pilot guide is received as the hole saw cuts progressively deeper through the material. A power source is connected to the closed end of said hole saw to provide the necessary power and torque to cut through the subject material.

The pilot guide, around which the hole saw is coaxially aligned and coupled, both aligns and stabilizes said hole saw when cutting through an indeterminate depth of material. The pilot guide renders the hole saw stable enough to cut holes at an angle through a material and also to cut holes through one or both sides of a hollow material, such as a pipe. Said pilot guide comprises a front guide, a stop, a rear guide, and a pilot pin. The front guide and stop include centrally-located apertures passing entirely through each component for receiving the pilot pin. The rear guide includes a central aperture that terminates within a base portion of said rear guide or which may pass entirely through said base portion so that the aperture terminates against a solid planar plate portion of said rear guide. The front guide, rear guide, and stop are coupled to said pin by screws threaded through side apertures that pass through the side surfaces of each part.

The front and rear guides of said hole saw provide additional alignment and stability to said hole saw as the hole saw cuts through an indeterminate depth of material, thereby preventing drifting and/or wobbling of said hole saw. The stop of said pilot guide spaces said front guide from the surface of the material through which the hole saw is cutting and holds the teeth of said hole saw away from the material to be cut before the cutting begins. In this way, the stop allows the hole saw to cut holes through a material at angles ranging from 1 to 50 degrees. The stop is not needed to cut holes through a material at angles ranging from 51 to 90 degrees.

The pilot pin has a first end and a second end over which the central apertures of the front guide and the stop are coaxially coupled to align said front guide and said stop while the hole saw descends coaxially over and around said pilot pin to cut the hole through an indeterminate depth of said material. The central aperture of the base of the rear guide is fitted over the second end of the pilot pin so that said second end of the pilot pin rests against and is capped by said rear guide.

Said hole-cutting saw is capable of cutting circular holes through much greater depths of material or layers of material with only one pass of the saw than other current conventional hole-cutting saws. The hole-cutting saw can accurately and precisely cut aligned holes through both solid materials and through opposing surfaces of hollow materials, such as a pipes and tubes.

The invention further includes a method for cutting holes of great depth through both solid and hollow materials using said hole saw and said pilot guide system. As a useful and conservational byproduct of the invention's one-pass cutting method, a dowel of plug material, which will have a diameter that is slightly smaller than the diameter of the hole saw, is formed by only one pass of the saw. The dowel of plug material can be placed back into the hole from which said plug material was cut or can be used in another application as needed rather than being discarded as waste.

An object of this invention is to provide a hole-cutting saw that cuts holes more efficiently and more precisely than current conventional hole saws.

Another object of this invention is to provide a hole saw and pilot guide system that eliminates the problem of drift and wobbling experienced when using current conventional hole saws, and particularly when using those saws to cut holes at an angle.

Still another object of this invention is to provide a hole saw and pilot guide system that can cut holes precisely at an angle through both solid materials and hollow materials.

Yet another object of this invention is to provide a hole saw and pilot guide that can cut holes through great materials of great thickness with only one pass rather than the multiple pass cuts performed by current conventional hole saws.

A further object of this invention is to provide a hole saw and pilot guide system that preserves the dowel of plug material, which is formed inside the hole saw during the cutting process, as a single piece that can be used for another purpose or reinserted into the hole.

In accordance with these and other objects which will become apparent hereinafter, the instant invention will now be described with particular reference to the accompanying drawings.

DETAILED DESCRIPTION

Figure 1:
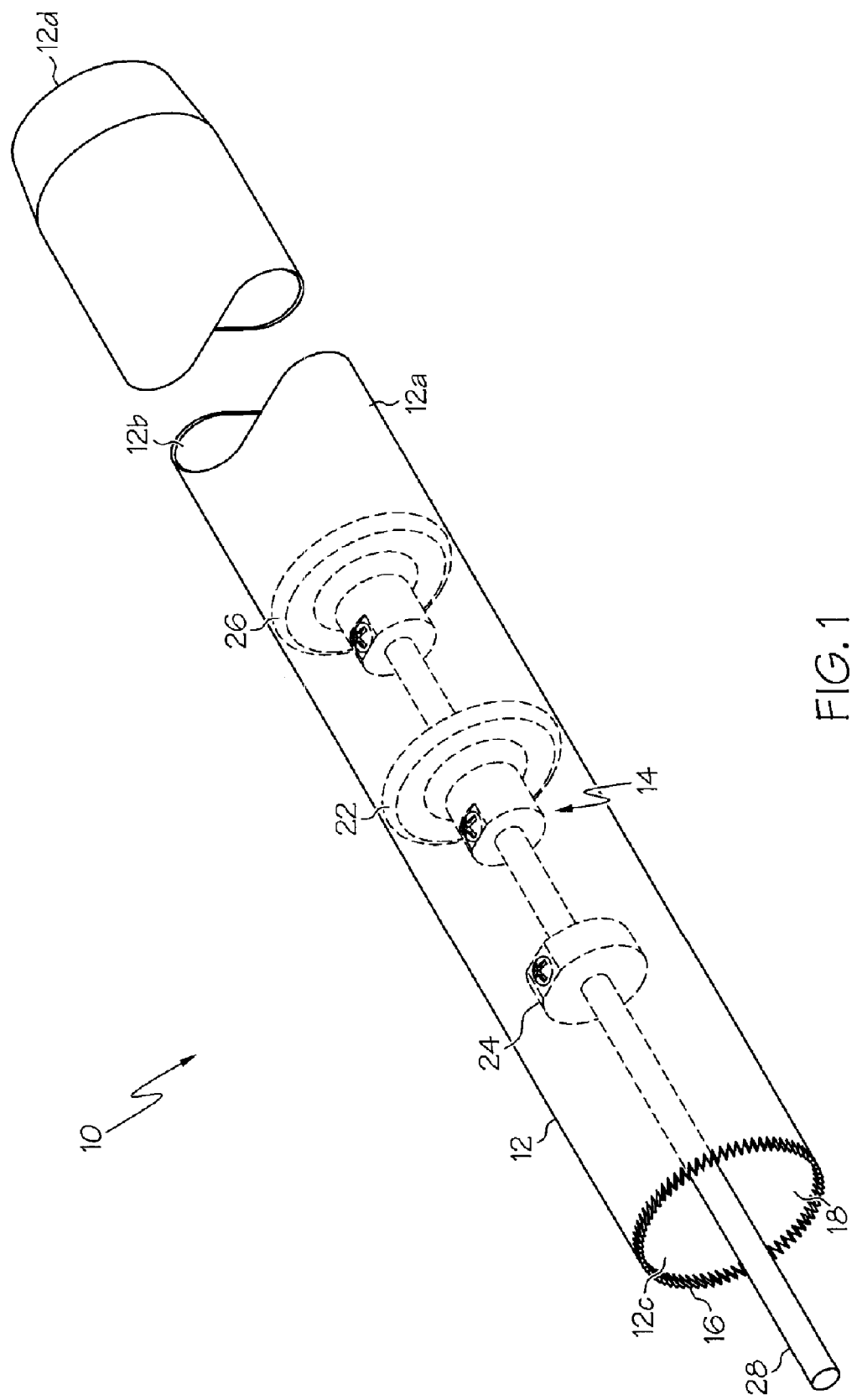
FIG. 1 shows a perspective view of the invention including the hole-cutting saw and a phantom view of the pilot guide system nested within the interior void of said saw.
Figure 2:
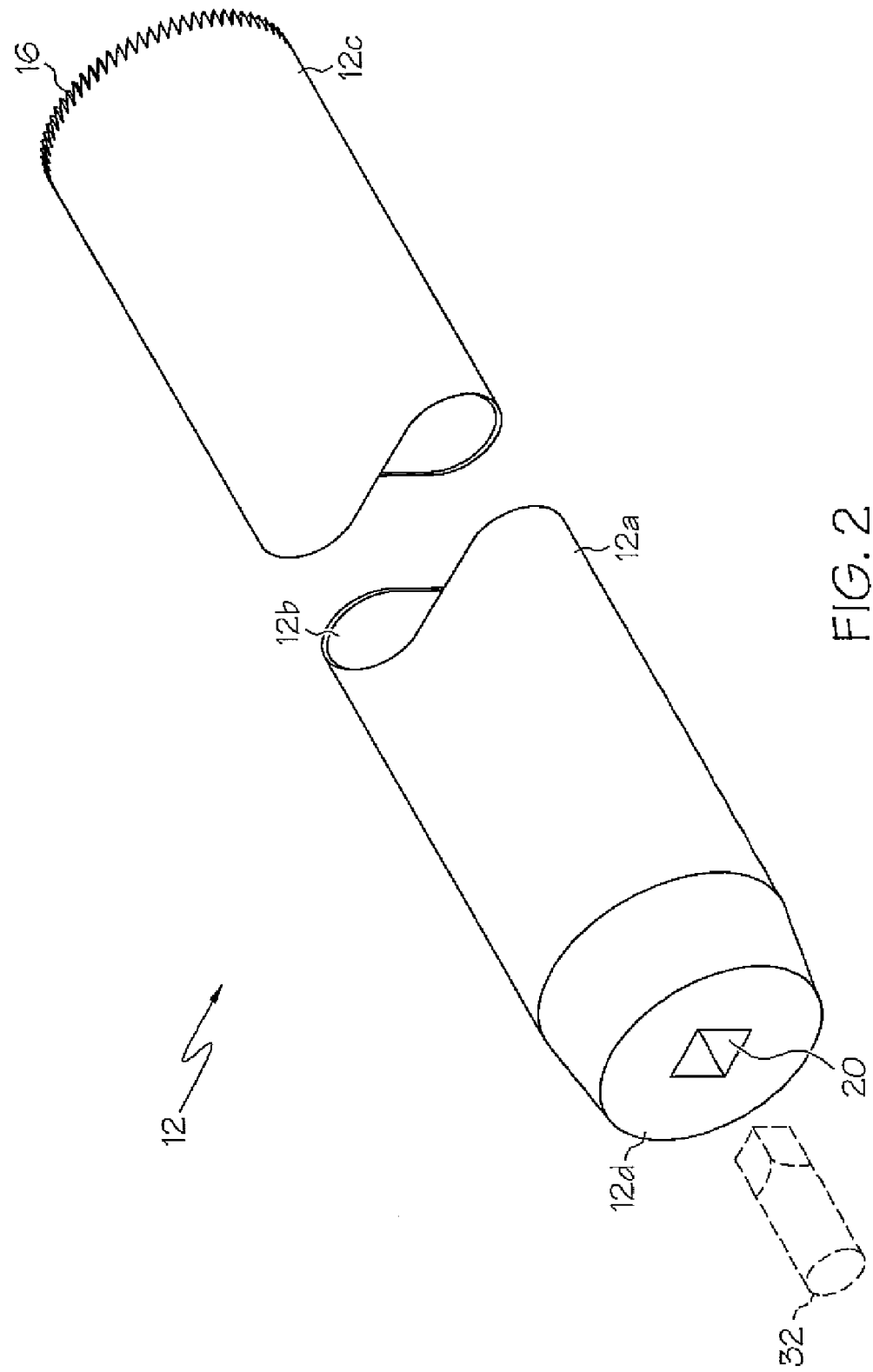
FIG. 2 shows an elevational end view of the chuck end of a hole saw.

FIG. 1 illustrates the invention 10, a pilot guide and hole-cutting saw system 10 for precisely cutting holes through a great thickness of material or layers of material, which comprises a hole saw 12 and a pilot guide 14 which is nested inside said hole saw 12 to provide stability to said hole saw during the cutting process. The circular, metallic hole saw 12, illustrated in FIGS. 1 and 2, comprises an outer cylindrical side surface 12a and inner cylindrical side surface 12b, an open end 12c, and a closed end 12d. Said open end 12c terminates in a plurality of spaced cutting teeth 16 that are arranged in an annular configuration around said open end 12c of the hole saw 12 and oriented axially away from the closed end 12d of said saw 12. The inner cylindrical surface 12b of the hole saw 12 surrounds a void 18, into which the pilot guide 14 is received (or becomes nested) as the hole saw 12 cuts progressively deeper through the material. A power source is connected to a chuck 20 on the beveled closed end 12d of said hole saw 12 to provide the necessary power and torque to cut through a material or layers of material.

Figure 3A:
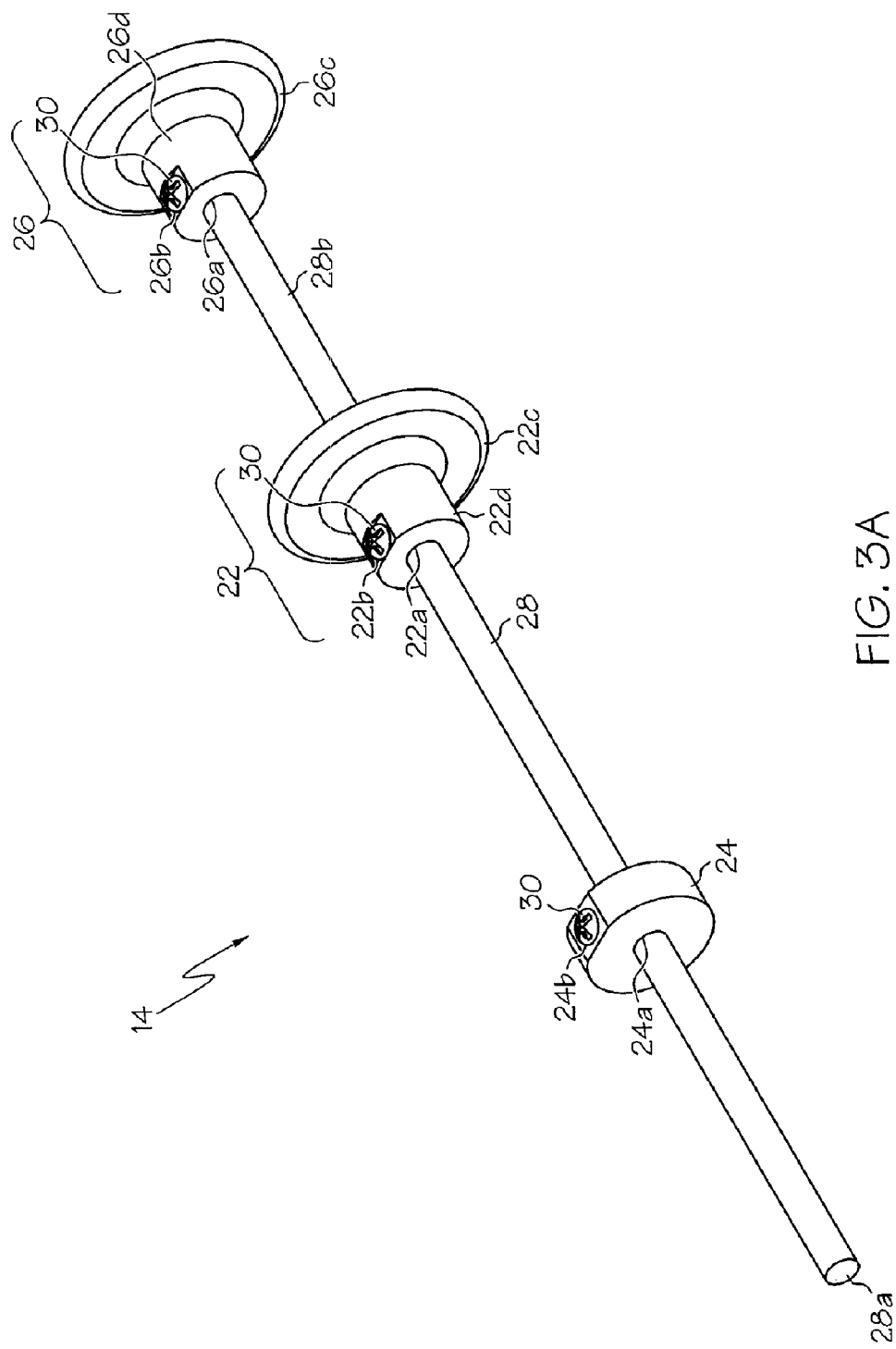
FIG. 3A shows a perspective view of the pilot guide with the first end of the pilot pin angled forward.
Figure 3B:
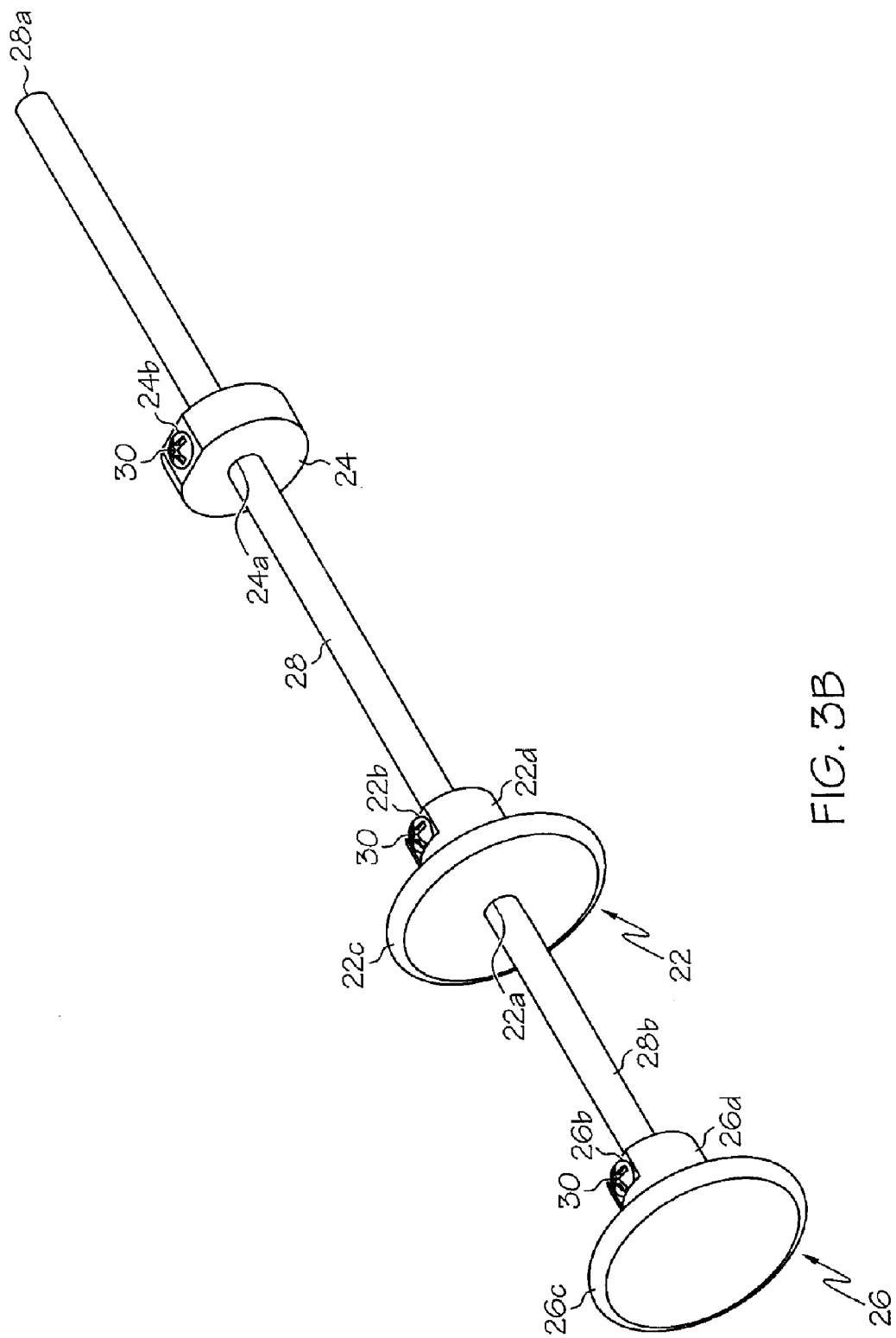
FIG. 3B shows a perspective view of the pilot guide with the second end of the pilot pin angled forward.

The pilot guide 14, around which the hole saw 12 is coaxially aligned and coupled, both aligns and stabilizes said hole saw 12 when cutting through an indeterminate depth of material. The pilot guide 14 renders the hole saw 12 stable enough to cut holes at an angle through a material and also to cut holes through one or both sides of a hollow material, such as a pipe. According to FIGS. 3A and 3B, said pilot guide 14 comprises a front guide 22, a stop 24, a rear guide 26, and a pilot pin 28. Said pilot guide is preferably manufactured from steel.

The front guide 22, which comprises a planar steel plate 22c having a central aperture 22a and including a centrally-positioned steel, cylindrical base 22d welded to one side of said plate 22c, aligns and stabilizes the hole saw 12 proximal to the surface of the material through which the hole is being cut. The central aperture 22a of said front guide 22 passes entirely through the planar plate 22c and cylindrical base 22d of said front guide 22. The steel base 22d of said front guide 22 is preferably cylindrical in shape. In this way, the hole saw 12 can cut through an indeterminate depth of said material while the pilot guide 14 prevents drifting and/or wobbling of said hole saw 12. Said front guide 22 further includes an aperture 22b through a side surface of the guide that connects with the central aperture 22a of said front guide 22. The purpose of the side aperture 22b of said front guide 22 is to receive a screw 30a that is threaded into said side aperture 22b so that said screw 30a contacts the surface of the pilot pin 28, thereby engaging and locking said front guide 22 in a fixed position and location on the length of the pilot pin 28.

The stop 24 of said pilot guide 14, which includes a central aperture 24a, spaces said front guide 22 from the surface of the material through which the hole saw 12 is cutting and holds the cutting teeth 16 of said hole saw 12 away from the material to be cut before the cutting begins. The stop 24 is cylindrically-shaped and is manufactured preferably from steel. Said stop 24 further includes an aperture 24b through a side surface of the stop 24 that connects with the central aperture 24a of said stop. The purpose of the side aperture 24b is to receive a screw 30b that is threaded into the side aperture 24b so that said screw 30b contacts the surface of the pilot pin 28, thereby engaging and locking said stop 24 in a fixed position and location on the length of the pilot pin 28.

Figure 4A:
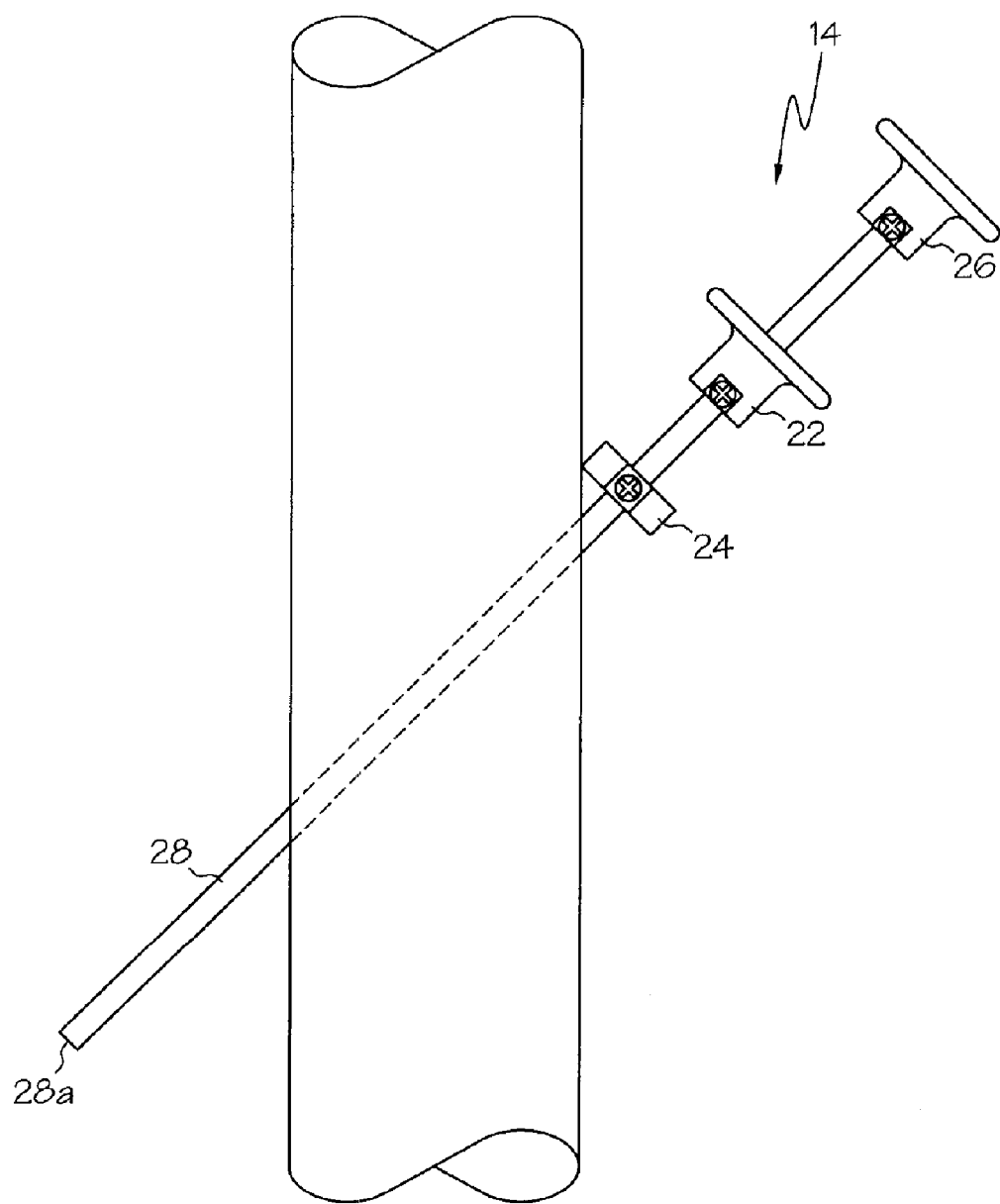
FIG. 4A shows an elevational side view of a pilot guide installed at an angle through a hollow pipe so that the pilot pin passes through pilot holes drilled into the two opposing sides of said pipe.
Figure 4B:
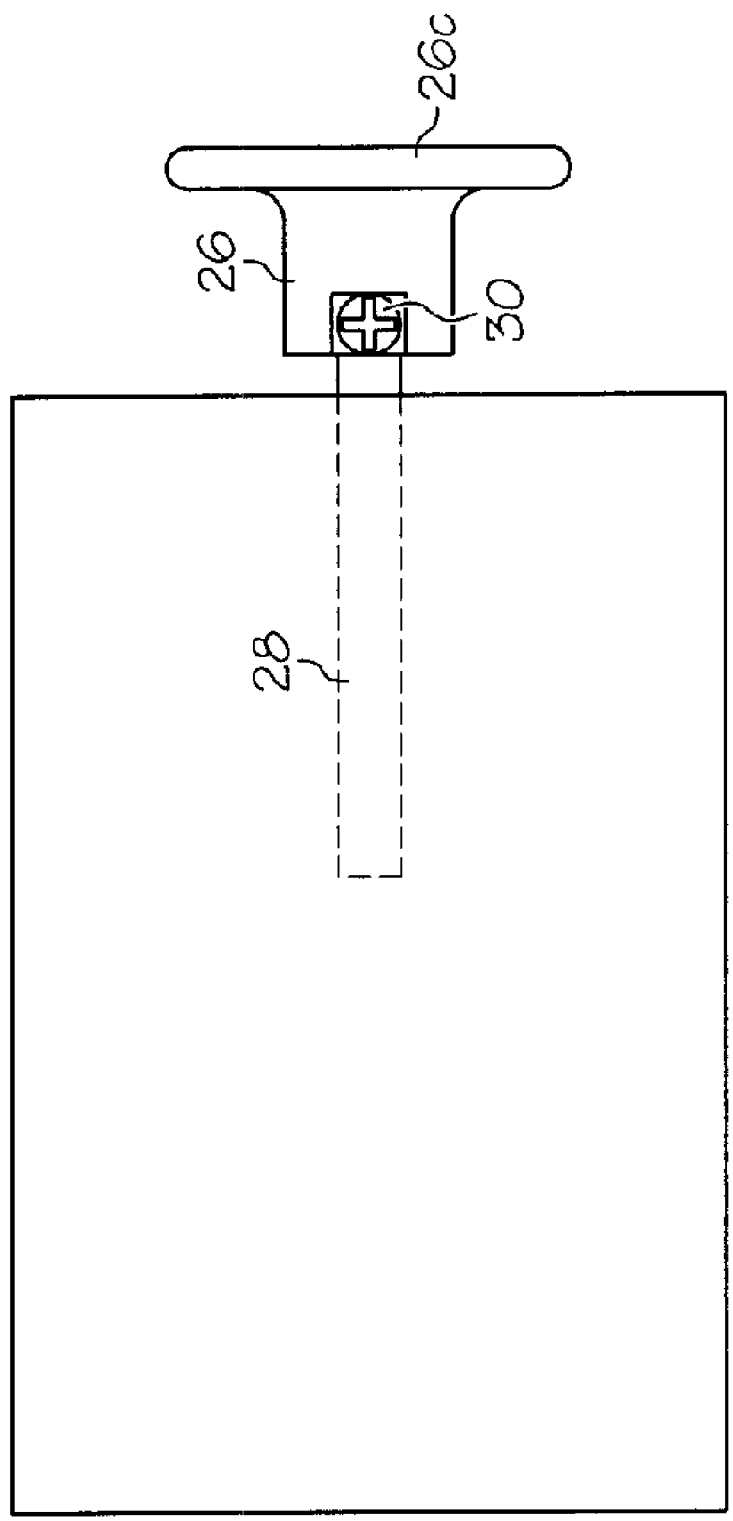
FIG. 4B shows an elevational side view of a pilot guide, using only the rear guide without the front guide and stop, installed at a 90 degree angle in a block of wood where a stop is not used.

Said stop 24 permits the cutting of deep holes through materials at an angle ranging from 1 to 50 degrees by providing additional space between the surface of said material and the front guide 22 so that the wider diameter of the planar plate 22c of said front guide 22 does not contact said material, thereby resulting in wobble or drift of the hole-cutting saw 12 due to instability of said hole saw 12. As illustrated in FIG. 4A, said stop 24 prevents wobbling and slipping of the pilot guide 14 when a hole is being cut at an angle by providing the additional space between said front guide 22 and the material through which the hole is being cut. Without said stop 24, the outer edge of the planar plate 22c of the front guide 22, rather than the planar face of the cylindrical base 22d, would contact the surface of the material. When cutting holes at an angle through a material, contact between the outer edge of the planar plate 22c would result in instability and wobbling of said hole saw 12 while contact between the flat surface of the stop 24, which provides space between the material's surface and the front guide 22, eliminates this problem. As shown in FIG. 4B, the stop 24 is not required to cut holes at angles between 51 and 90 degrees because at those angles the outer edge of the planar plate 22c of the front guide 22 and rear guide 26 cannot contact the surface of the material through which said hole is to be cut.

The rear guide 26 of said pilot guide 14, which comprises a solid planar steel plate 26c having a centrally-positioned steel base 26d welded to one side of said plate 26c, provides additional alignment and stability nearer the power source of said hole saw 12 as the hole saw cuts through an indeterminate depth of material to prevent drifting and/or wobbling of said hole saw 12. Said steel base 26d of said rear guide 26 is preferably cylindrical in shape. The steel base 26d further includes a central aperture 26a, which may pass either partially or entirely through said steel base 26d, for receiving the pilot pin 28. Where the aperture 26a passes entirely through the steel base 26d, said planar steel plate 26c acts as a stop against which the pilot pin 28 may rest. Thus, the rear guide 26 is attached over one end of the pilot pin 28, and said pilot pin does not pass entirely through said rear guide. As with the front guide 22, said rear guide 26 also includes an aperture 26b through a side surface of the guide 26 that connects with the central aperture 26a of said rear guide 26. The purpose of the side aperture 26b of said rear guide 26 is to receive a screw 30c that is threaded into said side aperture 26b so that said screw 30c contacts the surface of the pilot pin 28, thereby engaging and locking said rear guide 26 in a fixed position and location at one end of the pilot pin 28. Said rear guide 26 and said front guide 22 are identical in size.

The rigid metallic pilot pin 28 has a first end 28a and a second end 28b over which the central apertures 22a, 24a, and 26a of the front guide 22, stop 24, and rear guide 26 are coaxially coupled to align said rear guide 26, said front guide 22, and said stop 24 while the hole saw 12 descends coaxially over and around said pilot pin 28 to cut the hole through an indeterminate depth of said material. The pilot pin 28 is preferably cylindrical in shape, and may be manufactured in varying lengths depending upon the length required for the application in which said pilot pin 28 is to be used. Thus, the pilot pin 28 is interchangeable depending upon the length needed to cut the depth of the hole required. Said pilot pin 28 is constructed preferably from standard ⅜ inch steel rods.

Said hole-cutting saw and pilot guide system 10 is capable of cutting circular holes through much greater depths of material or layers of material with only one pass of the saw than other current conventional hole-cutting saws. Conventional hole saws bottom out when attempting to cut holes of great depth so that the saw must be removed and the plug material removed before cutting can continue. However, the present invention 10 permits one pass-cutting of holes through great depths of material due to the use of the pilot guide 14 and the longer hole saw 12, which said pilot guide 14 is capable of accommodating to cut precisely without wobbling. The invention 10 can accurately and precisely cut aligned holes through both solid materials and through opposing surfaces of hollow materials, such as a pipes and tubes. Said invention 10 can cut holes effectively and precisely at an angle through the surface of solid and hollow materials without experiencing wobbling or slipping of the saw that could result in an irregular hole or damage to the saw 12 and/or pilot guide 14.

The invention 10 may be used with any power source or chuck system. The hole saw 12 may also include or be connectable to a ½ inch drive shaft 32 for engaging and using said hole saw 12 with a standard drill motor. Usage of the ½ inch drive increases the power and torque that can be applied to the saw 12. Two drive plates are beveled and welded to the closed drive end 12d of the hole saw 12 to increase the strength of said saw. When the ½ inch drive shaft is used, said shaft may be welded to the closed end 12d of said saw 12.

Using the hole-cutting saw and pilot guide system 10 described herein, the applicant has been able to cut holes ranging from 6 inches to 20 feet in length through both solid and hollow materials. The hole-cutting saw 12 is manufactured most commonly in lengths ranging from 6 inches to 36 inches, however, longer lengths may be produced up to 20 feet in length. The bi-metal cutting teeth 16 of said hole saw 12 are designed for cutting deep holes through steel, aluminum, brass, wood, fiberglass, and all composite materials. The applicant's invention 10 is not a core drill and is not designed for cutting holes through concrete, brick, or masonry.

The invention 10 further includes a method for cutting holes of great depth through both solid and hollow materials. First, a ⅜ inch pilot hole must be drilled into the surface of the material through which a hole is to be cut using a standard drill which is not a part of this invention. The first end 28a of a pilot pin 28 is inserted into said pilot hole so as to allow a front guide 22 and a stop 24 to be coaxially coupled through their central apertures 22a and 24a around said pilot pin 28. The stop 24 is coupled with a second end 28b of said pilot pin 28 by coaxially aligning and slidably engaging the central aperture 24a of the stop 24 with said second end 28b of the pilot pin 28 so that said stop 24 contacts the surface of the material to be cut. Next, the front guide 22 is coupled with the second end 28b of said pilot pin 28 by coaxially aligning and slidably engaging the central aperture 22a of the front guide 22 with said second end 28b of the pilot pin 28. A rear guide 26 is attached to the second end 28b of said pilot pin 28 by coaxially aligning and slidably engaging the central aperture 26a of the steel base 26d of said rear guide 26 with said second end 28b of the pilot pin 28. Because aperture 26a does not pass entirely through the rear guide 26, the second end 28b of the pilot pin 28 rests against the solid rear guide 26 where the aperture 26a ends.

Once the pilot guide 14 has been assembled and installed following the steps above, the open end 12c of said hole saw 12 is coaxially aligned and slidably engaged over said pilot guide 14, said pilot guide 14 being comprised of the pilot pin 28, stop 24, front guide 22, and rear guide 24 assembly. The diameters of both front and rear guides 22 and 26 is approximately equal to the inner diameter of the interior void 18 that is surrounded by an inner cylindrical surface 12b of the hole saw 12. Thus, said pilot guide 14 is nested within the cylindrical void 18 inside of said hole saw 12, thereby contacting the inner cylindrical surface 12b of the hole saw 12 and providing stability to the hole saw 12 to prevent wobbling or drifting of the saw 12.

Figure 5:
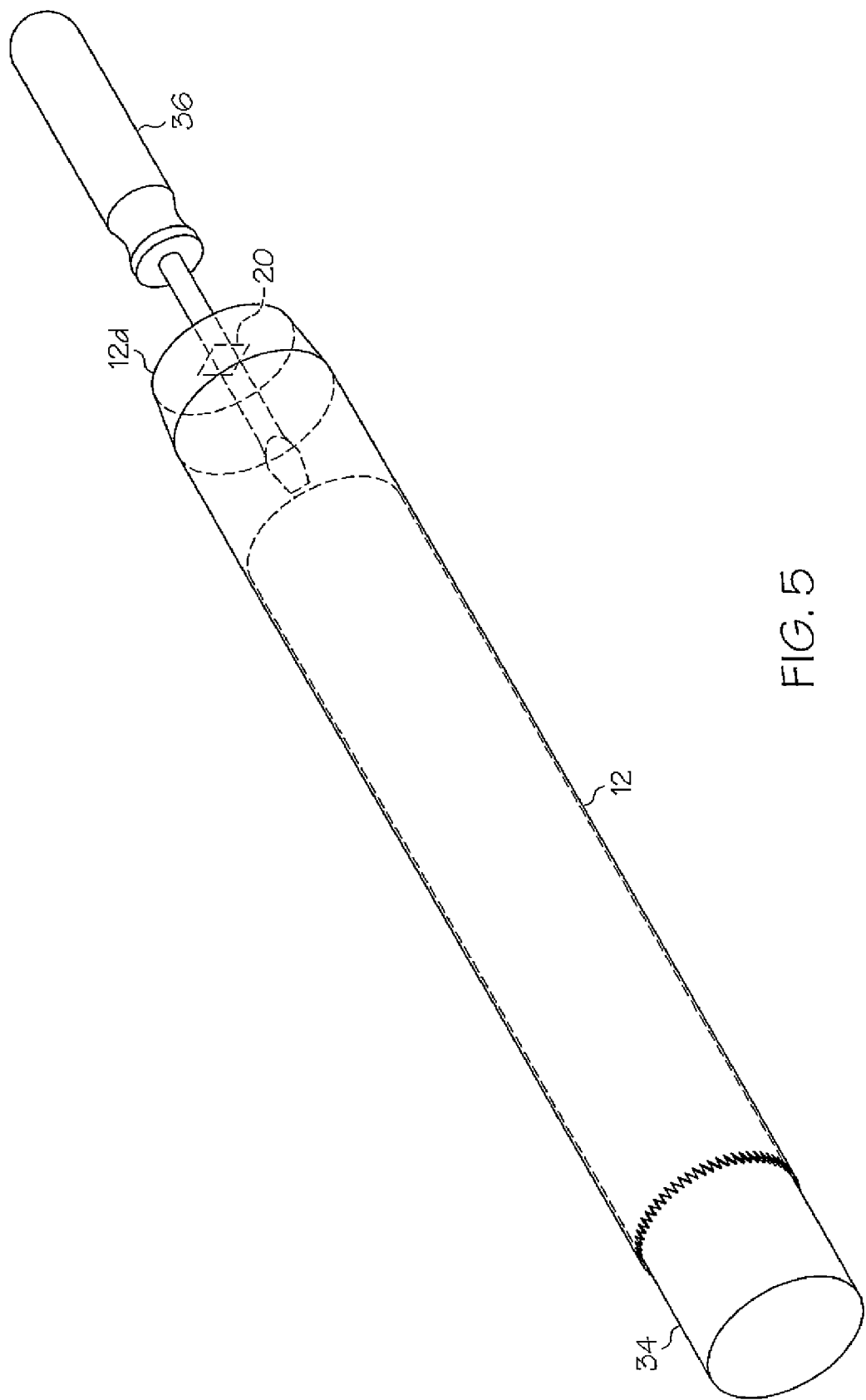
FIG. 5 shows the removal of the plug material from the hole saw by inserting a screw driver into the drive end of the hole saw and applying force to the back end of the rear guide to expel the dowel of plug material.

Finally, a drive shaft can be connected to a chuck 20 on a closed end 12d of said hole saw 12 and inserted into a chuck of an electric drill or other power source to provide the rotation and torque necessary to cut holes with said hole saw 12. This drive shaft may have one end that is triangular in shape to match the chuck jaws of a drill motor, which eliminates spinning that is common when using round drill bit ends. Either manual or mechanical force may be applied to the hole saw 12 to achieve firm contact between a plurality of cutting teeth 16 of said hole saw 12 and the material until a hole of the desired depth is cut. As a useful and conservational byproduct of the invention's one-pass cutting method, a dowel of plug material, which will have a diameter that is slightly smaller than the diameter of the hole saw 12, is formed by only one pass of the saw 12. The dowel of plug material can be placed back into the hole from which said plug material was cut or can be used in another application as needed rather than being discarded as waste. As illustrated in FIG. 5, the plug material 34 is removed from the hole saw 12 by inserting a rod or screw driver 36 into the chuck 20 on the closed drive end 12d of the hole saw 12 and applying force to the rod or screw driver, which is in contact with the rear guide 26, to expel said dowel of plug material. Finally, the dowel of plug material must be disengaged from the pilot guide 14, which is inserted into the pilot hole of the dowel.

To cut a single hole through only one surface of a hollow material, a single pilot hole is drilled into the surface of the pipe or other hollow material through which only one hole is to be cut. However, as shown in FIG. 4A, to cut a single hole entirely through both sides of a hollow material two coaxially aligned pilot holes must be drilled in opposing surfaces of the pipe or other hollow material. For example, to saw a 2-inch hole through an 8-inch pipe, a pilot pin 28 that is long enough (in this case, 11-12 inches) to go through the two pilot holes must be installed.

The invention can also be used to saw a hole which overlaps an existing hole. To perform this task, a cap made from wood or other material is placed so as to cover the existing hole. The pilot hole is drilled into the wooden cap and the pilot pin of the pilot guide is inserted into said pilot hole, thereby installing said pilot guide 14 to permit the sawing of the hole that is to overlap said existing hole.

The instant invention has been shown and described herein in what is considered to be the most practical and preferred embodiment. The applicant recognizes, however, that departures may be made therefrom within the scope of the invention and that obvious modifications will occur to a person skilled in the art.

What is claimed is:

1. A pilot guide and hole-cutting saw system for precisely cutting holes through a great thickness of material or layers of material, comprising:
   a circular, metallic hole saw with a plurality of spaced cutting teeth and including both inner and outer cylindrical surfaces surrounding a void and a closed drive end to which a power source is connected for providing the necessary power and torque to cut through a material or layers of material; and
   a pilot guide for aligning and stabilizing said hole saw when cutting through an indeterminate depth of material;
      wherein said pilot guide comprises:
         a front guide connected to a pilot pin;
         a rear guide connected to the pilot pin; and
         a stop connected to the pilot pin for spacing the front guide from the surface of the material being cut by the hole saw.

2. The invention according to claim 1, wherein said pilot guide further comprises:
   said front guide including a central aperture and aligning and stabilizing the hole saw at the surface of the material being cut as said hole saw cuts through an indeterminate depth of said material to prevent drifting and/or wobbling of said hole saw;
   said stop including a central aperture said spacing said front guide from the surface of the material through which the hole saw is cutting and for holding the teeth of said hole saw away from the material to be cut before the cutting begins;
   said rear guide providing additional alignment and stability proximal to the power source of said hole saw as the hole saw cuts through an indeterminate depth of material to prevent drifting and/or wobbling of said hole saw; and
   said pilot pin being of a rigid metallic material and having a first end and a second end over which are coaxially coupled the central apertures of the front guide and the stop to align said front guide and said stop while the hole saw descends coaxially over and around said pilot pin to cut the hole through an indeterminate depth of said material.

3. The invention according to claim 2, wherein said stop includes an aperture through a side surface of the stop whereby said side aperture connects with the central aperture of said stop, said side aperture having the purpose of receiving a screw that is threaded into the side aperture so that said screw contacts the surface of the pilot pin, thereby engaging and locking said stop in a fixed position and location on the pilot pin.

4. The invention according to claim 2, wherein said front guide and said rear guide are identical in size.

5. The invention according to claim 2, wherein said front guide comprises:
   a planar plate;
   a centrally-positioned base firmly connected to one side of said plate;
   a central aperture passing entirely through said plate and said base; and
   a side aperture passing through a side surface of said base so that said side aperture connects with the central aperture of said front guide, said side aperture of said front guide having the purpose of receiving a screw that is threaded into the side aperture so that said screw contacts the surface of the pilot pin, thereby engaging and locking said front guide in a fixed position and location on the pilot pin.

6. The invention according to claim 2, wherein said rear guide comprises:
   a solid planar plate;
   a centrally-positioned base firmly connected to one side of said plate;
   a central aperture passing either entirely or partially through said base for fitting over the second end of the pilot pin; and
   a side aperture passing through a side surface of the rear guide that connects with the central aperture of the base of said rear guide, said side aperture of said rear guide having the purpose of receiving a screw that is threaded into the side aperture so that said screw contacts the surface of the pilot pin, thereby engaging and locking said rear guide in a fixed position on the second end of the pilot pin.

7. The invention according to claim 1, wherein a central aperture of a rear guide ends either within the base or passes entirely through said base of the rear guide so that when the central aperture of the rear guide is fitted over the second end of a pilot pin, said second end of the pilot pin is stopped by and rests against either the interior of the base at the end of the central aperture or against the surface of the solid planar plate where said central aperture passes entirely through said base.

8. The invention according to claim 1, wherein said closed end of said hole-cutting saw is beveled and includes a chuck to which said power source is connected to provide torque and power to the hole saw.

9. The invention according to claim 1, wherein said hole-cutting saw is constructed in lengths ranging from 6 inches to 20 feet to be capable of cutting circular holes through great depths of material or layers of material.

10. The invention according to claim 1, wherein said hole-cutting saw includes a means for accurately and precisely cutting aligned holes through opposing surfaces of a hollow object.

11. The invention according to claim 1, wherein said hole-cutting saw includes a means for effectively cutting holes at an angle through a surface without wobbling or slipping.

12. The invention according to claim 2, wherein the pilot pin may be manufactured in varying lengths so that said pilot pin is interchangeable depending upon the length needed to cut the depth of the hole required.

13. The invention according to claim 2, wherein the stop permits the cutting of deep holes at an angle through materials, said angle ranging from 1 to 50 degrees, by providing additional space between the surface of said material and the front guide so that the wider diameter of the planar plate of said front guide does not contact said material, thereby resulting in wobble or drift of the hole-cutting saw due to instability of said hole saw.

14. The invention according to claim 1, wherein the hole-cutting saw and pilot guide are both constructed from steel.

15. The invention according to claim 2, wherein the pilot pin is constructed from standard 3/8 inch steel rods.

16. The invention according to claim 1, wherein the hole-cutting saw includes a 1/2 inch drive shaft for engaging and using with a standard drill motor.

17. A method for cutting holes of great depth, wherein said method comprises the following steps:
   drilling a pilot hole into the surface of the material through which a hole is to be cut;
   inserting a first end of a pilot pin of a pilot guide into said pilot hole;
   coupling a stop with a second end of said pilot pin by coaxially aligning and slidably engaging a central aperture of the stop with said second end of the pilot pin and pushing the stop down the length of the pilot pin toward the first end of said pilot pin so that said stop contacts the surface of the material to be cut;
   coupling a front guide with the second end of said pilot pin by coaxially aligning and slidably engaging a central aperture of the front guide with said second end of the pilot pin;
   coupling a rear guide with the second end of said pilot pin by coaxially aligning and slidably engaging a central aperture of a base of the rear guide with said second end of the pilot pin so that said pilot pin stops and rests against the interior of the rear guide where said aperture ends;
   coaxially aligning and slidably engaging a hole saw over the pilot guide, said pilot guide being comprised of the pilot pin, stop, front guide, and rear guide assembly, so that said pilot guide is nested inside a cylindrical void inside of said hole saw;
   connecting a drive shaft to a rear side of said hole saw and inserting said drive shaft into the chuck of an electric drill or other power source to provide rotation and torque to the hole saw; and
   applying either manual or mechanical force to the hole saw to achieve firm contact between a plurality of teeth of said hole saw and the material until a hole of the desired depth is cut.

18. The method of claim 17, wherein a dowel of plug material, which will have a diameter that is slightly smaller than the inner diameter of the hole saw, is formed by only one pass of the saw, thereby producing plug material that can be placed back into the hole from which said plug material was cut or can be used in another application as needed rather than being discarded as waste.

19. The method of claim 18, wherein said plug material is removed from the hole saw by inserting a rod or screw driver into the drive end of the hole saw and applying force to the back end of the rear guide to expel the dowel of plug material.

20. The method of claim 17, wherein a single pilot hole is drilled in the surface of a pipe or other hollow material through which only one hole is to be cut.

21. The method of claim 17, wherein two coaxially aligned pilot holes must be drilled in opposing surfaces of a pipe or other hollow material when the hole to be cut by the hole saw is to pass entirely through both sides of said material.

22. A hole-cutting saw and pilot guide system for precisely cutting holes through a great thickness of material or layers of material, comprising:

means for cutting a hole with only one pass of said cutting means through the material through which said hole is to be cut;

means for coaxially aligning said cutting means; and means for stabilizing said cutting means to allow precision cutting of said hole by eliminating drift and wobble of said cutting means.

23. The hole-cutting saw and pilot guide system of claim 22, wherein said stabilizing means comprises a stop connected to a pilot pin of a pilot guide to allow said cutting means to cut a hole through both solid and hollow materials at an angle.

* * * * *